US012683109B2

(12) United States Patent
Triscari et al.

(10) Patent No.: US 12,683,109 B2
(45) Date of Patent: Jul. 14, 2026

(54) THRUST BEARING VENT FOR A LIQUID METAL BEARING ASSEMBLY

(71) Applicant: GE Precision Healthcare LLC, Waukesha, WI (US)

(72) Inventors: Andrew T. Triscari, Hubertus, WI (US); Alexander T. Ryan, Milwaukee, WI (US); Swarnajay Mukherjee, Franklin, WI (US); Eric J. Lubar, Milwaukee, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 284 days.

(21) Appl. No.: 18/497,804

(22) Filed: Oct. 30, 2023

(65) Prior Publication Data

US 2025/0140508 A1 May 1, 2025

(51) Int. Cl.
*H01J 35/10* (2006.01)

(52) U.S. Cl.
CPC .................................. *H01J 35/103* (2013.01)

(58) Field of Classification Search
CPC ........ H01J 35/10; H01J 35/103; H01J 35/104; H01J 2235/1086; F16C 17/24; F16C 17/107; F16C 33/109; F16C 2210/08; F16C 2220/62; F16C 2240/30; F16C 2240/60; F16C 2240/70; F16C 2240/94; F16C 2380/16
See application file for complete search history.

(56) References Cited

U.S. PATENT DOCUMENTS

| | | | |
|---|---|---|---|
| 5,068,885 | A | 11/1991 | Vetter |
| 5,384,819 | A | 1/1995 | Ono |
| 5,504,797 | A | 4/1996 | Vetter |
| 5,602,898 | A | 2/1997 | Vetter |
| 5,668,849 | A | 9/1997 | Sugiura |
| 6,477,232 | B2 | 11/2002 | Yoshida |
| 11,676,791 | B2 | 6/2023 | Hunt |

FOREIGN PATENT DOCUMENTS

| | | | |
|---|---|---|---|
| JP | 3737140 | B2 | 1/2006 |

OTHER PUBLICATIONS

EP application 24206404.6 filed Oct. 14, 2024—extended Search Report issued Apr. 3, 2025; 10 pages.

*Primary Examiner* — Jurie Yun

(57) ABSTRACT

Various systems are provided for a liquid metal bearing assembly. In one embodiment, a liquid metal bearing assembly includes a first liquid metal reservoir, a second liquid metal reservoir, and a thrust bearing vent extending between the first liquid metal reservoir and the second liquid metal reservoir to vent gas between the first liquid metal reservoir and to the second liquid metal reservoir. A first end of the thrust bearing vent is connected to the first liquid metal reservoir at a point of the first liquid metal reservoir closest to a central axis of the liquid metal bearing assembly.

21 Claims, 7 Drawing Sheets

THRUST BEARING VENT FOR A LIQUID METAL BEARING ASSEMBLY

FIELD

Embodiments of the subject matter disclosed herein relate to systems with liquid metal bearing assemblies and thrust bearing vents of the liquid metal bearing assemblies.

BACKGROUND

Liquid metal bearings are used in a variety of operating environments due to their increased longevity and ability to more effectively manage thermal loads, relative to roller bearings. Certain x-ray sources or x-ray tubes, for example, utilize liquid metal bearing assemblies, which may include at least one liquid metal bearing, owing at least in part to their durability and thermodynamic characteristics. However, asymmetric liquid metal distribution and gas formation in the bearing's liquid metal interface can occur in the bearing.

SUMMARY

In one embodiment, a liquid metal bearing assembly includes a first liquid metal reservoir, a second liquid metal reservoir, and a thrust bearing vent extending between the first liquid metal reservoir and the second liquid metal reservoir to vent gas between the first liquid metal and to the second liquid metal reservoir. A first end of the thrust bearing vent is connected to the first liquid at a point of the liquid metal reservoir closest to a central axis of the liquid metal bearing assembly.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
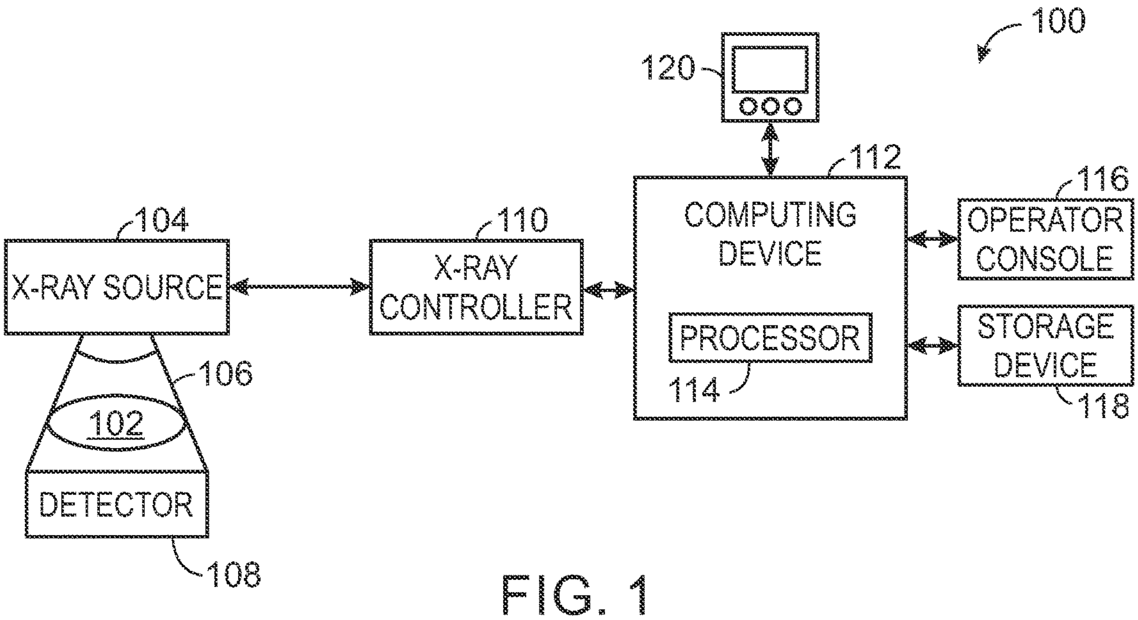
FIG. 1 shows a block schematic diagram of an exemplary x-ray imaging system, according to an embodiment.
Figure 2:
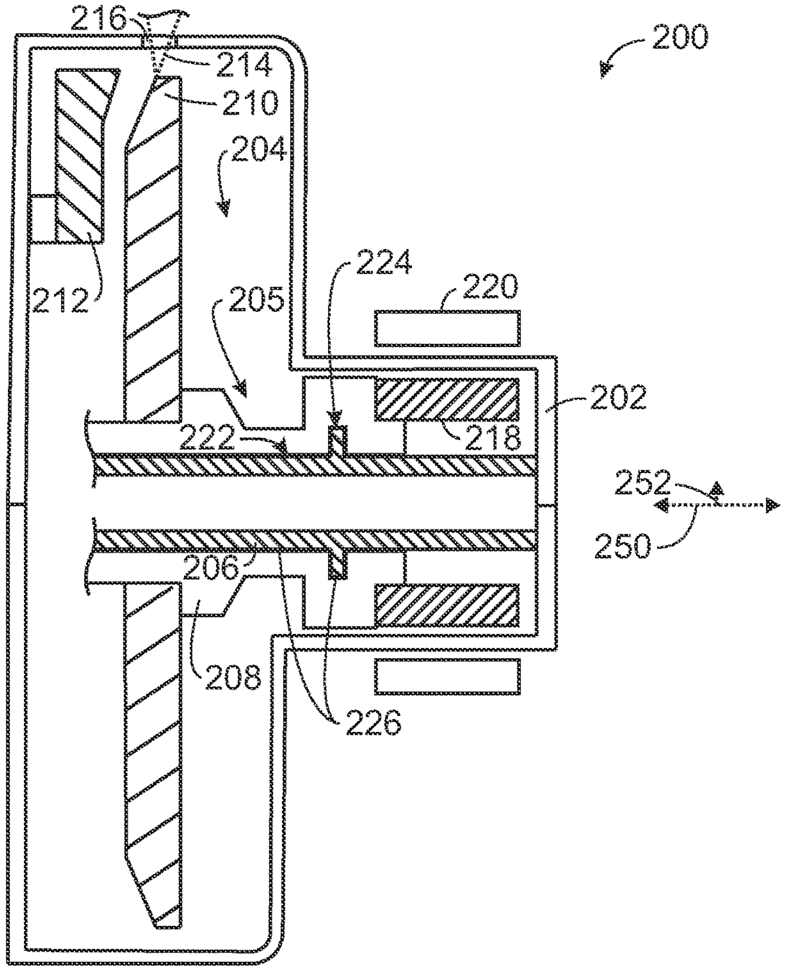
FIG. 2 shows a pictorial view of a portion of an x-ray source, according to an embodiment.
Figure 3:
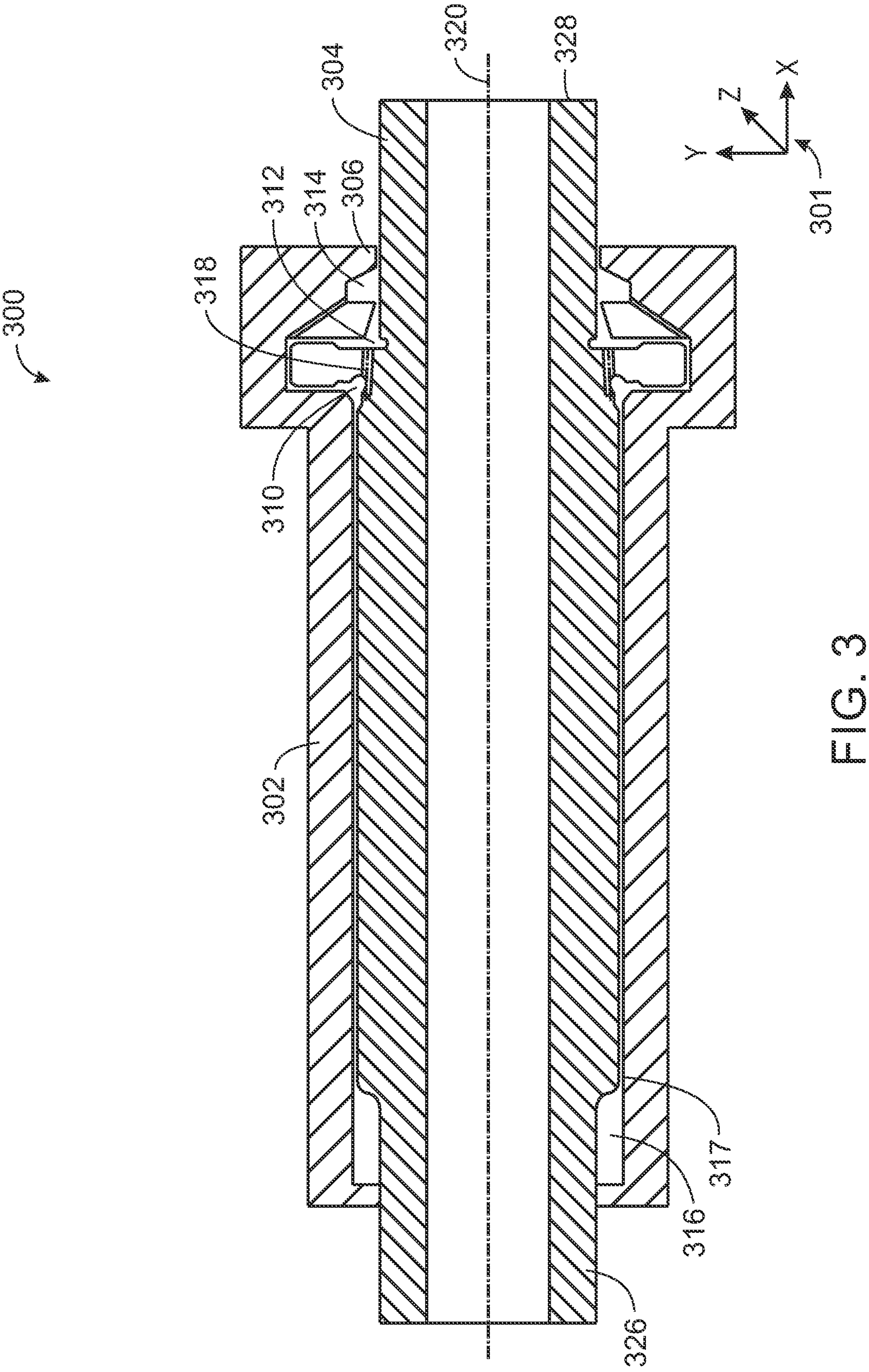
FIG. 3 shows a first exemplary liquid metal bearing assembly, according to an embodiment.

The following description relates to various embodiments for a liquid metal bearing assembly and more specifically, a thrust bearing vent of the liquid metal bearing assembly. The liquid metal bearing assembly may be included in an x-ray source of an X-ray imaging system, an example block diagram of which is shown in FIG. 1. An embodiment of an x-ray source is shown in FIG. 2, where the x-ray source is configured with a liquid metal bearing assembly to enable rotation of an anode of the x-ray source. The liquid metal bearing assembly is described herein with respect to an x-ray source of an x-ray imaging system for explanatory purposes, and the liquid metal bearing assembly may be implemented in other systems without departing from the scope of the present disclosure, such as a computed tomography (CT) imaging system. FIG. 3 shows an embodiment of the liquid metal bearing assembly of FIG. 2, where the liquid metal bearing assembly is configured with a rotating sleeve and a stationary shaft. FIGS. 4-8 show various example embodiments of a thrust bearing vent disposed between the shaft and the sleeve of the liquid metal bearing assembly of FIG. 3. FIGS. 9A-9G shows example radial positions of the one or more thrust bearing vents that may be positioned around the shaft relative to the applied gantry load and center of axis.

Conventional methods for assembling a liquid metal bearing assembly configured as a straddle bearing include exposing seals of the liquid metal bearing assembly and introducing liquid metal, for example, by spilling liquid metal over the seals. Additionally, the liquid metal bearing assembly may be assembled in an orientation where a rotational axis of the liquid metal bearing assembly is parallel with a direction of gravity. When implemented in an x-ray source or x-ray tube, the liquid metal bearing assembly may be positioned horizontally, such that a rotational axis is perpendicular to a direction of gravity. Additionally or alternatively, when implemented in an x-ray source or x-ray tube, the liquid metal bearing assembly may be positioned with the rotational axis positioned at a non-parallel angle, with respect to a direction of gravity. For example, the x-ray source or x-ray tube may be integrated into a moving structure such as a rotating gantry of a CT imaging system. The aforementioned assembly methods and/or operation of liquid metal bearings may result in trapped gases between the shaft and the sleeve of the liquid metal bearing. The trapped gas may cause instability due to increased pressure in the X-ray tube and reduced bearing performance of both journal and thrust bearing due to lack of lubrication supplied to the bearing. A liquid metal bearing assembly is desired that enables the trapped gasses to be vented from the area between the shaft and the sleeve, thus increasing the performance and reliability of the X-ray tube.

Example liquid metal bearing assemblies are described herein that include a thrust bearing vent that removes trapped gas from a liquid metal reservoir positioned between the shaft and the sleeve. The thrust bearing vent is positioned between the shaft and the sleeve, with an first end at a lowest point of the reservoir and a second end at a second reservoir that is exposed to the vacuum pressure of the insert. Capillary action draws liquid metal and any gas trapped in the first reservoir through the thrust bearing vent to the second reservoir. Additionally, centrifugal forces move gallium outwards and gas inwards, which results in more gas being vented through flange holes. In some examples, a diameter of the first end of the vent is the same as a diameter of the second end of the vent. Alternatively, the diameter of the first end is different than the diameter of the second end. In examples where the diameter of the first end is different than the diameter of the second end, the capillary action pull the liquid metal and any gas in the direction of the larger diameter opening of the thrust bearing vent.

One or more thrust bearing vents may be positioned radially around the shaft relative to the applied gantry load and center of axis. The placement of the vents may be symmetrical or asymmetrical. The radial position of the thrust bearing vents may also affect the amount of gas that is vented due to a pressure gradient within the liquid metal bearing. For example, the vent being positioned at the bottom allows for a maximum amount of gas to be removed.

Before further discussion of the liquid metal bearing assembly with a thrust bearing vent, an example imaging system in which the liquid metal bearing assembly may be implemented is shown. FIG. 1 illustrates an x-ray imaging system 100 designed to generate x-rays. The x-ray imaging system 100 is configured as an x-ray imaging system that may be a computed tomography (CT) imaging system, a radiography imaging system, a fluoroscopy imaging system, a mammography imaging system, an interventional imaging system, a tomography system, etc. in FIG. 1. However, the x-ray imaging system 100 has applicability to fields beyond imaging, medical devices, and the like. For instance, the x-ray imaging system 100 may be deployed in crystallography systems, security scanners, industrial scanners, x-ray photography systems, and so on. In the imaging system example, the system may be configured to image a subject 102 such as a patient, an inanimate object, one or more manufactured parts, and/or foreign objects such as implants, stents, and/or contrast agents present within the body.

The x-ray imaging system 100 may include at least one x-ray source 104, such as an x-ray tube, configured to generate and project a beam of x-ray radiation 106. Specifically, in the illustrated embodiment, the x-ray source 104 is configured to project the x-ray radiation beams 106 towards a detector array 108 and through the subject 102. In some system configurations, the x-ray source 104 may project a cone-shaped x-ray radiation beam which is collimated to lie within an X-Y-Z plane of a Cartesian coordinate system. However, other beam profiles and/or systems omitting the detector array have been envisioned. Each detector element of the array produces a separate electrical signal that is a measurement of the x-ray beam attenuation at the detector location.

Although FIG. 1 depicts only a single x-ray source 104 and detector array 108, in certain embodiments, multiple x-ray sources and/or detectors may be employed to project a plurality of x-ray radiation beams and detect said beams. For instance, in the CT machine use-case example, multiple detectors may be used in tandem with the x-ray sources to acquire projection data at different energy levels corresponding to the subject.

The x-ray imaging system 100 may further include an x-ray controller 110 configured to provide power and timing signals to the x-ray source 104. It will be understood that that system may also include a data acquisition system configured to sample analog data received from the detector elements and convert the analog data to digital signals for subsequent processing.

In certain embodiments, the x-ray imaging system 100 may further include a computing device 112 having a processor 114 and controlling system operations based on operator input. The computing device 112 receives the operator input, for example, including commands and/or scanning parameters via an operator console 116 operatively coupled to the computing device 112. The operator console 116 may include a keyboard, a touchscreen, and/or other suitable input device allowing the operator to specify the commands and/or scanning parameters.

Although FIG. 1 illustrates only one operator console 116, more than one operator console may be included in the x-ray imaging system 100, for example, for inputting or outputting system parameters, requesting examinations, plotting data, and/or viewing images. Further, in certain embodiments, the x-ray imaging system 100 may be coupled to multiple displays, printers, workstations, and/or similar devices located either locally or remotely, for example, and connected via wired and/or wireless networks. In one embodiment, a display 120 may be in electronic communication with the computing device 112 and is configured to display graphical interfaces indicating system parameters, control setting, imaging data, etc.

In one example, the computing device 112 stores the data in a storage device 118. The storage device 118, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 112 provides commands to the x-ray controller 110 and other system components for controlling system operations such as x-ray beam formation, data acquisition and/or processing, etc. Thus, in certain embodiments, the computing device 112 controls system operations based on operator input. To elaborate, the computing device 112 may use the operator-supplied and/or system-defined commands and parameters to operate an x-ray controller 110, which in turn, may control the x-ray source 104. In this way, the intensity and timing of x-ray beam generation may be controlled. It will also be understood that the rotational speed of a sleeve in the x-ray source may be adjusted by the computing device 112 in conjunction with the x-ray controller 110. The sleeve may be a rotating element of a liquid metal bearing assembly, as described herein in greater detail.

Various methods and processes may be stored as executable instructions in non-transitory memory on a computing device (or controller) in x-ray imaging system 100. In one embodiment, the x-ray controller 110 may include the executable instructions in non-transitory memory, and may apply the methods to control the x-ray source 104. In another embodiment, computing device 112 may include the instructions in non-transitory memory, and may relay commands, at least in part, to the x-ray controller 110 which in turn adjusts the x-ray source output.

FIG. 2 shows a detailed embodiment of a portion of an x-ray source, such as an x-ray tube 200. The x-ray tube 200 shown in FIG. 2 serves as an example of the x-ray source 104 depicted in FIG. 1. As such, the x-ray source shown in FIG. 2 as well as the other x-ray source embodiments described herein may include functional and/or structural features from the x-ray source 104, shown in FIG. 1, or vice versa. Furthermore, alternate embodiments combining features from one or more of the systems have also been envisioned. A rotational axis 250 along with a radial axis 252 are provided in FIG. 2 for reference. It will be understood that a radial axis is any axis perpendicular to the rotational axis 250.

The x-ray tube 200 includes a housing 202 having a low-pressure enclosure 204 (e.g., vacuum enclosure) formed therein. It will be understood that a low-pressure enclosure infers a comparatively low-pressure relative to atmospheric pressure. As such, the pressure in the enclosure may be less than atmospheric pressure.

The x-ray tube 200 includes a liquid metal bearing assembly 205 with a rotational component 208 and a stationary component 206. In the illustrated embodiment, the rotational component 208 is a sleeve and the stationary component 206 is a shaft. However, embodiments in which the sleeve is stationary and the shaft rotates have been contemplated. It will be understood that the motion denoted by the descriptors stationary and rotational denote the relative motion between the components. However, in certain use-case examples, the x-ray tube may be integrated into a moving structure. For instance, in the CT imaging system use-case, the x-ray tube may be integrated into a rotating gantry. As such, in smaller scale frame of reference, the shaft is stationary relative to the sleeve but in a larger scale frame of reference, both components exhibit similar rotational motion in the gantry. However, in alternate use-case scenarios, the x-ray tube may be integrated into a stationary structure in regard to the larger scale frame of reference. It will also be appreciated that the liquid metal bearing assembly described in greater detail herein may be deployed in alternate types of systems utilizing liquid metal bearings, in some instances.

A rotor 218 and a stator 220 are also provided in the x-ray tube 200. The rotor 218 is coupled to the rotational component 208 and is designed to impart rotational motion thereto. The stator 220 is shown positioned external to the low-pressure enclosure 204. However, other suitable stator locations have been envisioned. Typically, the rotor and stator can include windings, magnets, electrical connections, etc., electromagnetically interacting to generate rotor rotation responsive receiving control commands, from, for example, the x-ray controller 110 shown in FIG. 1.

The x-ray tube 200 further includes an anode 210 and a cathode 212. The anode 210 is coupled to the rotational component 208, which may impart rotation of the anode 210 during generation of an x-ray beam. The cathode 212 is part of a cathode assembly and may receive signals from a controller, such as the x-ray controller 110 shown in FIG. 1, to generate an electron beam directed toward a surface of the anode 210. An x-ray beam 214 is generated when the electron beam from the cathode 212 strikes the anode 210. The x-rays are emitted through an x-ray window 216 in the housing 202.

Turning to the liquid metal bearing assembly 205, a plurality of liquid metal bearings may comprise the assembly. In the illustrated embodiment, the liquid metal bearing assembly 205 may include a liquid metal journal bearing 222 and a liquid metal thrust bearing 224, both of which may be supplied liquid metal by a liquid metal reservoir, as described with respect to FIG. 3. However, assembly configurations with additional or alternate bearings may be used, in other embodiments. The liquid metal journal bearing 222 is designed to support radial loads and the liquid metal thrust bearing 224 is designed to support axial loads. In this way, loads on the sleeve (e.g., the rotational component 208) may be managed to enable efficient sleeve rotation.

Each of the bearings of the liquid metal bearing assembly 205 include an interface 226 in which liquid metal acts as a lubricant and also supports radial and axial loads. The thickness of the interface may be selected based on factors such as the type of liquid metal used in the bearing, manufacturing tolerances of the components, expected system operating temperature, and so on. Thus, in one use-case example the thickness of the liquid metal interface may be on the order of 5 microns (μm)-40 μm. The thickness of the liquid metal interface of the liquid metal journal bearing 222 may be in the radial direction of the liquid metal bearing assembly 205 (e.g., with respect to the radial axis 252), and the thickness of the liquid metal interface of the liquid metal thrust bearing 224 may be in the radial direction and an axial direction, parallel to the rotational axis 250, of the liquid metal bearing assembly 205. The liquid metal used as the working fluid in the bearing assembly may include gallium, tin, indium, combinations thereof, and so on. The embodiments of a liquid metal bearing assembly described herein with respect to FIGS. 3-11 may use gallium as the liquid metal lubricant.

FIG. 3 depicts an embodiment of a liquid metal bearing assembly 300. In some examples, the liquid metal bearing assembly 300 may be similar to, or the same as, the liquid metal bearing assembly 205, depicted in FIG. 2. As such, features from the bearing assembly 205 and more generally, the x-ray tube 200 may be included in the liquid metal bearing assembly 300 as well as the other liquid metal bearing assembly embodiments described herein. An axis system 301 is provided in FIG. 3 for reference. The y-axis may be a vertical axis (e.g., parallel to a direction of gravity during conditions in which the liquid metal bearing assembly 300 is mounted to an x-ray source of an imaging system, such as the x-ray imaging system 100 described above with reference to FIG. 1), the x-axis may be a lateral axis (e.g., horizontal axis), and the z-axis may be a longitudinal axis, in one example. However, the axes may have other orientations, in other examples.

The liquid metal bearing assembly 300 includes a rotating component which may be referred to herein as sleeve 302, and a stationary component which may be referred to herein as shaft 304. The sleeve 302 and shaft 304 may be coupled such that the sleeve 302 is rotatable relative to the shaft 304. Each of the sleeve 302 and the shaft 304 are configured with structures which form a liquid metal flow path when the liquid metal bearing assembly 300 is assembled, as shown in FIG. 3 (e.g., the shaft 304 enclosed in the sleeve 302). The liquid metal flow path may include one or more liquid metal reservoirs 310, 312, 314 (e.g., a lubricant reservoir), a reservoir 316, a gap 317, and one or more thrust bearing vents 318. The reservoirs 310, 312, 314 may be machined as part of the sleeve 302 or formed together with the sleeve 302 (e.g., machined, drilled) and be positioned radially distant from a bearing centerline. For example, the bearing centerline may be a central axis of rotation 320, which is equivalent to the rotational axis 250 of FIG. 2. Further detail regarding the thrust bearing vents 318 is described with respect to FIGS. 4-8.

The liquid metal reservoirs 310, 312, 314 may extend annularly around the shaft 304. One or more of the liquid metal reservoirs 310, 312, 314 may be positioned between the shaft 304 and the sleeve 302. The liquid metal reservoirs 310, 312, 314 may be fluidically coupled to the reservoir 316. The liquid metal reservoirs 310, 312, 314 may hold a volume which is greater than a combined fill volume of the reservoir 316 and the gap 317. For example, the combined fill volume may be between 2 g and 20 g, depending on a design of the bearing. For example, conventional liquid metal reservoirs may hold less than 2 g of gallium.

The liquid metal flow path including the liquid metal reservoirs 310, 312, 314, the reservoir 316, and the gap 317 may have an annular configuration between the sleeve 302 and the shaft 304. The one or more thrust bearing vents 318 may be positioned periodically around the interface between the sleeve and the shaft between two of the liquid metal reservoirs. A sloping diameter (e.g., tapering) of the shaft 304 and the sleeve 302 provides a narrowing in width (e.g., between the shaft 304 and the sleeve 302) of the liquid flow path from the liquid metal reservoir 316 to the gap 317 Described another way, at the reservoir 316, a diameter of the shaft 304 may increase, relative to a diameter of the shaft 304 at the liquid metal reservoir 312, and a diameter of the interior of the sleeve 302 may decrease, relative to a diameter of the interior of the sleeve 302 at the liquid metal reservoir 312, thus decreasing an overall width of the liquid metal flow path between the shaft 304 and the sleeve 302 in a direction from the first end 326 toward the second end 328 of the shaft.

During assembly of the liquid metal bearing assembly 300, liquid metal (e.g., gallium) may be injected or otherwise inserted into the liquid metal reservoir 316. The liquid metal may be funneled by the reservoir 316 to an intersection of the reservoir 316 and the gap 317. A width of the gap 317 may be less than a width of a bead of liquid metal, therefore the liquid metal may not flow into the gap 317. The liquid metal bearing assembly 300 may be heated and capillary forces may pull the liquid metal from the reservoir 316 into the gap 317. The liquid metal may thus coat surfaces of bearings of the liquid metal bearing assembly 300 (e.g., a liquid metal journal bearing and/or a liquid metal thrust bearing) to create bearing surfaces which have a continuous layer of liquid metal extending between the sleeve 302 and the shaft 304. This may provide smooth, uninterrupted rotation of the sleeve 302 relative to the shaft 304, such as during operation of an x-ray tube to generate x-ray beams, as described with respect to FIGS. 1 and 2. The liquid metal bearing assembly 300 may further include seals in a lower region 306 of the liquid metal bearing assembly 300, designed to reduce an amount of liquid metal leaking from the bearings. For example, the seals may be rotating seals, compression seals, and so on. The seals may impede liquid metal flow in an axial direction (e.g., along the central axis of rotation 320) away from an anode, such as the anode 210 shown in FIG. 2.

Figure 4:
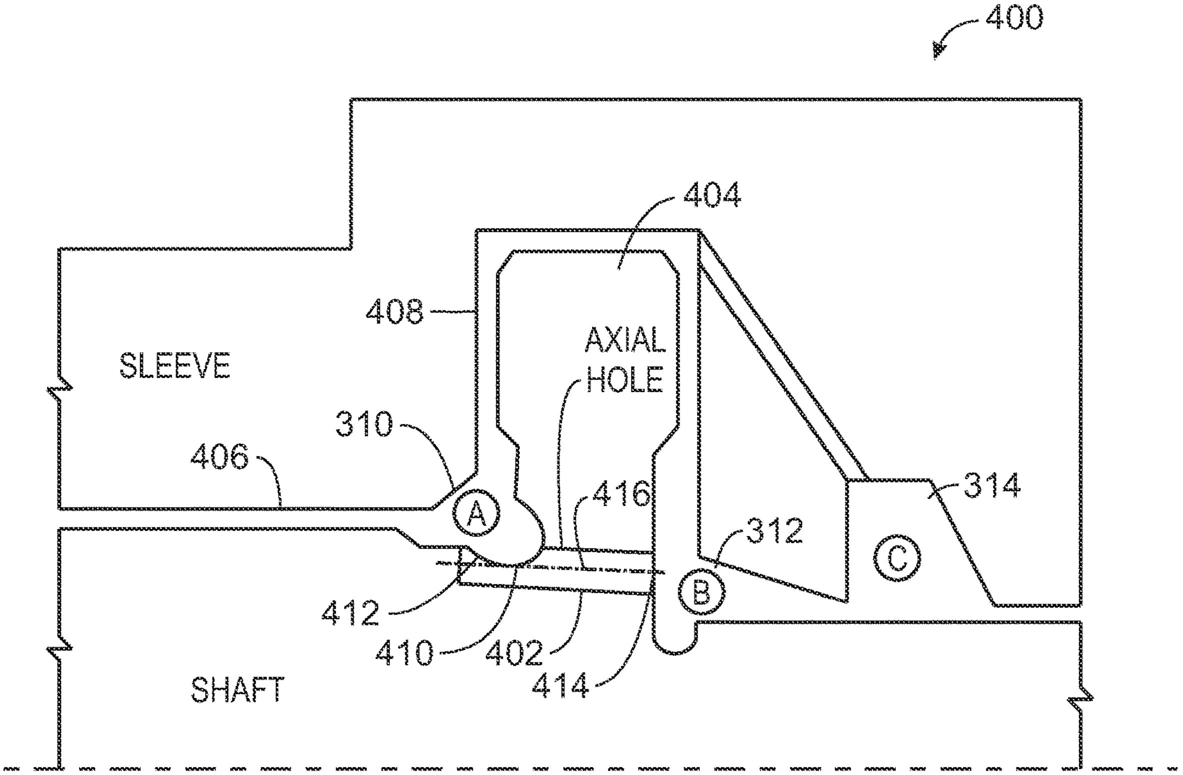
FIG. 4 shows a first embodiment of a thrust bearing vent of a liquid metal bearing assembly, according to an embodiment.

Turning to FIG. 4, a first example embodiment 400 of a thrust bearing vent 402 of a liquid metal bearing assembly is shown. The thrust bearing vent 402 is an axial hole placed through the thrust flange 404 of the liquid metal bearing intercepting the first liquid metal reservoir 310 formed between the journal 406 and thrust bearings 408 and extending to the second liquid metal reservoir. The example thrust bearing vent 402 extends between the first liquid metal reservoir 310 and the second liquid metal reservoir 312 and has a first end 412 connected to a lowest point 410 (e.g., a point closest to the central axis of rotation 320) of the first liquid metal reservoir 310 and a second end 414 connected to the second liquid metal reservoir 312. The contact point 412 between the thrust bearing vent 402 and the liquid metal reservoir 310 is at the lowest point 410 to enable the maximum removal of gas trapped in the liquid metal reservoir 310. Surface tension and centrifugal effects of rotating the sleeve will ensure the gas trapped in the first liquid metal reservoir 310 will fully vent through the thrust bearing vent 402, leaving no remaining bubbles in the liquid metal reservoir 310 after rotation speeds reach approximately 10 Hz.

A centerline 416 of the thrust bearing vent 402 of the example embodiment 400 of FIG. 4 is positioned parallel to a central axis of rotation 320, thus having a relative angle of 0 degrees. In the illustrated example, the angle is approximately 8.5 degrees. In other examples, the angle may be between 0 and 15 degrees. The example thrust bearing vent 402 has a constant diameter, which may be between 0.1 mm and 2.5 mm, but is preferably between 0.5 mm and 1.5 mm. The example thrust bearing vent 402 may be created using any suitable machining method, including drilling or laser drilling.

Figure 5:
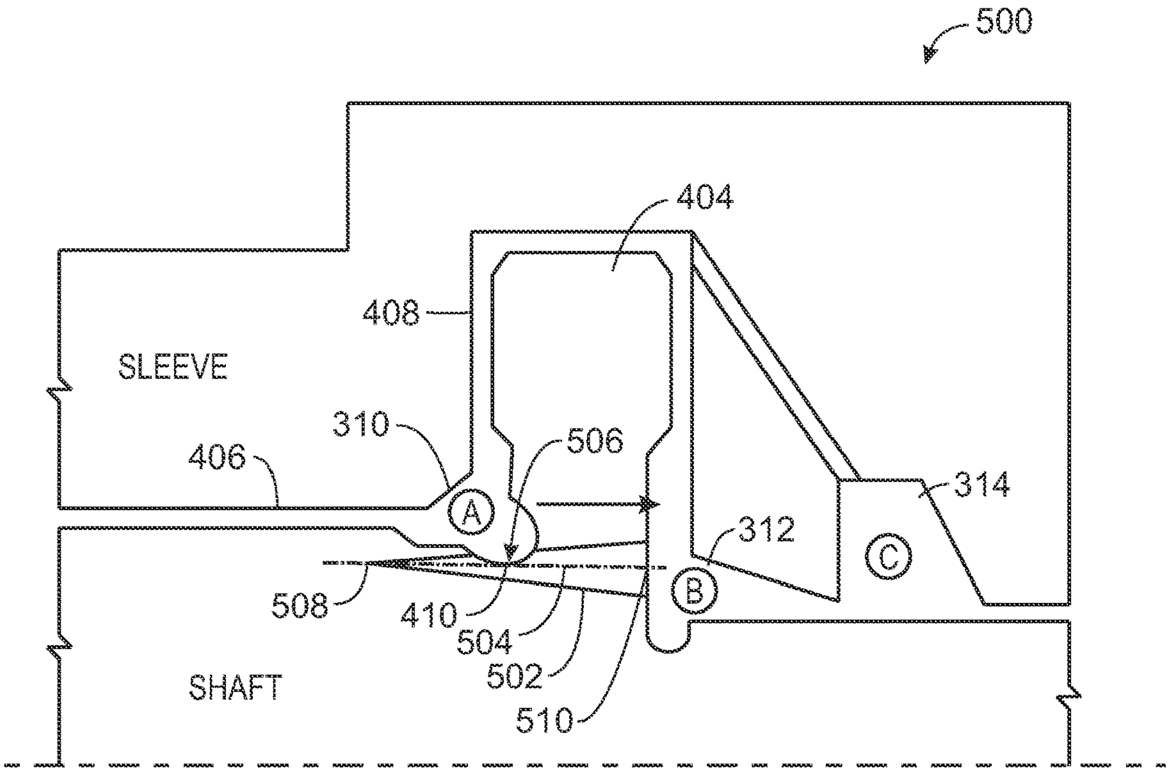
FIG. 5 shows a second embodiment of a thrust bearing vent of a liquid metal bearing assembly, according to an embodiment.

FIG. 5 depicts a second example embodiment 500 of a thrust bearing vent 502 in a liquid metal bearing assembly. The thrust bearing vent 502 is a conically-shaped hole placed through the thrust flange 404 of the liquid metal bearing intercepting the first liquid metal reservoir 310 formed between the journal 406 and thrust bearings 408 and extending to the second liquid metal reservoir 312. The example thrust bearing vent 502 is substantially symmetrical about a central axis 504, aside from the opening 506 at the first liquid metal reservoir 310. Additionally, a central axis 504 of the thrust bearing vent 502 of the illustrated embodiment is parallel to the central axis 320 of the bearing assembly. However, in other embodiment, thrust bearing vent 502 may be asymmetrical and/or may have a central axis that is positioned at an angle relative to the central axis of the bearing assembly.

Similar to the thrust bearing vent 402, the thrust bearing vent 502 of FIG. 5 connects to the first liquid metal reservoir 310 at the lowest point 410 of the reservoir 310. In the illustrated example, the conically-shaped thrust bearing vent 502 has a first end 508 that is tapered to a point and a second end 510 connected to the second liquid metal reservoir 312. The thrust bearing vent 502 contacts the first liquid metal reservoir 310 along a top of a sloped surface of the conically-shaped hole. The diameter at the point where the contact is made between the thrust bearing vent 502 and the first liquid metal reservoir 310 is smaller than a diameter at the point of contact between the thrust bearing vent 502 and the second liquid metal reservoir 312. For example, the diameter of the thrust bearing vent 502 at the contact point at the first liquid reservoir 310 may be 0.5 mm and the diameter at the contact point the second liquid reservoir may be 1.5 mm. Other suitable dimensions may be used, such as any diameters between 0.1 mm and 2.5 mm. The example thrust bearing vent 502 may be created using any suitable machining method, including drilling or laser drilling.

This change in diameter results in a departure angle from the contact point at the first liquid metal reservoir 310 that is greater than 0 degrees, resulting in a lower capillary force in the direction of the opening 510 at the second liquid metal reservoir 312. The larger the angle of departure, the more reduction in the capillary forces. The lower capillary force of the example embodiment 500 allows for gas to easily escape the first liquid metal reservoir 310 while creating an increased sealing effect preventing gas from returning from the second liquid metal reservoir 312 to the first liquid metal reservoir 310.

Figure 6:
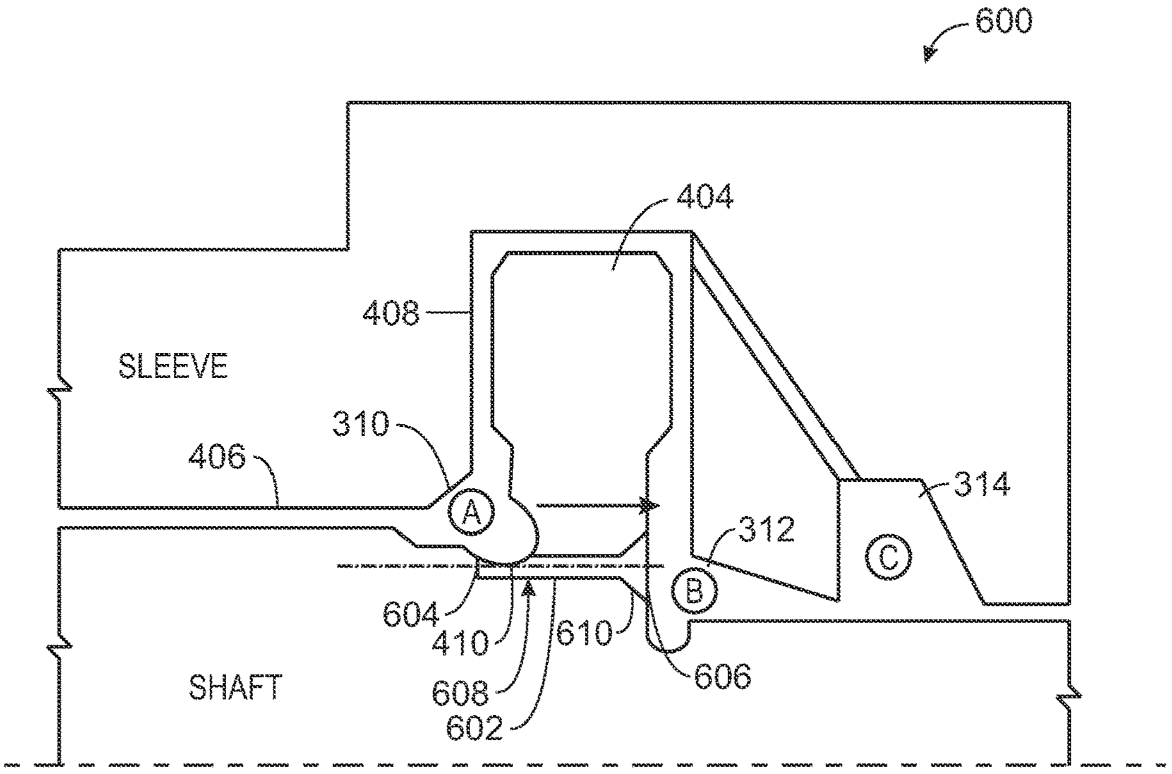
FIG. 6 shows a third embodiment of a thrust bearing vent of a liquid metal bearing assembly, according to an embodiment.

FIG. 6 depicts a third example embodiment 600 of a thrust bearing vent 602 in a liquid metal bearing assembly 300. The thrust bearing vent 602 is placed through the thrust flange 404 of the liquid metal bearing 300 intercepting the first liquid metal reservoir 310 formed between the journal 406 and thrust bearings 408 and extending to the second liquid metal reservoir 312. Similar to the thrust bearing vents 402, 502 of FIGS. 4 and 5, a first end 604 of the thrust bearing vent 602 is connected to the first liquid metal reservoir 310 at the lowest point 410 and a second end 606 is connected to the second liquid metal reservoir 312.

The example thrust bearing vent 602 of FIG. 6 includes a first portion 608 that has a constant diameter and a second portion 610 that is flared or chamfered from the first portion. In the illustrated example, the flared portion 610 is connected to the second liquid metal bearing reservoir 312. Additionally, the second portion 610 in the illustrated example is shorter than the first portion 608, but in other examples, the second portion 610 may be equal in length or longer than the first portion 608. The diameter at the point where the contact is made between the thrust bearing vent 602 and the first liquid metal reservoir 310 is smaller than a diameter at the point of contact between the thrust bearing vent 602 and the second liquid metal reservoir 312. For example, the diameter of the thrust bearing vent 602 at the contact point at the first liquid reservoir 310 may be 0.5 mm and the diameter at the contact point the second liquid reservoir 312 may be 1.5 mm. Other suitable dimensions may be used, such as any diameters between 0.1 mm and 2.5 mm. The example thrust bearing vent 602 may be created using any suitable machining method, including drilling or laser drilling. The change in diameter between the first portion 608 and the end 606 of the second portion 610 where the thrust bearing vent 602 contacts the second liquid metal reservoir 312 reduces the capillary action and increasing the sealing capability of the thrust bearing vent 602 in a similar manner as described in conjunction with the thrust bearing vent 502 of FIG. 5. Thus, the example thrust bearings 502 and 602 of FIGS. 5 and 6 create a one-way capillary valve for gas to pass from the first liquid reservoir 310 to the second liquid reservoir 312.

Figure 7:
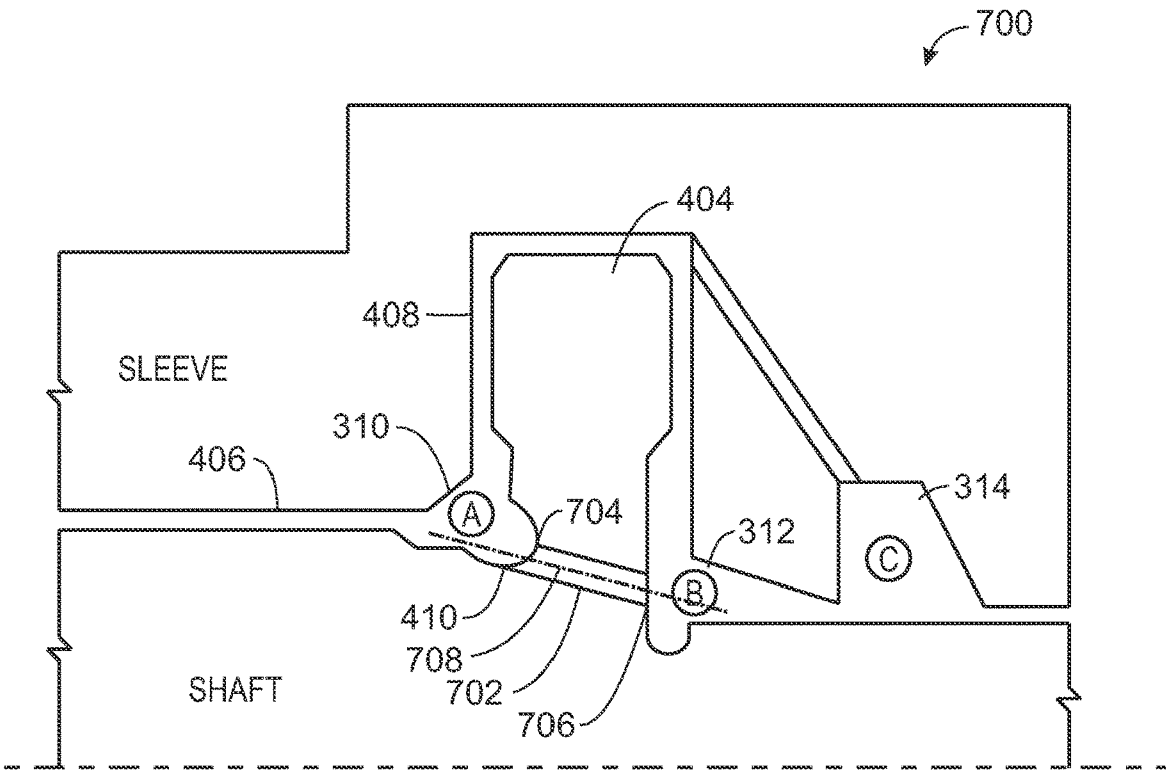
FIG. 7 shows a fourth embodiment of a thrust bearing vent of a liquid metal bearing assembly, according to an embodiment.

FIG. 7 depicts a fourth example embodiment 700 of a thrust bearing vent 702 of a liquid metal bearing assembly 300. The thrust bearing vent 702 is placed through the thrust flange 404 of the liquid metal bearing 300 intercepting the first liquid metal reservoir 310 formed between the journal 406 and thrust bearings 408 and extending to the second liquid metal reservoir 312. Similar to the thrust bearing vents 402, 502, 602 of FIGS. 4-6, a first end 704 of the thrust bearing vent 702 is connected to the first liquid metal reservoir 310 at the lowest point 410 and a second end 706 is connected to the second liquid metal reservoir 312.

In the illustrated example of FIG. 7, the thrust bearing vent 702 has a constant diameter and is positioned such that a center axis 708 of the thrust bearing vent 702 is angled relative to the central axis 320 of the bearing assembly 300. This enables bi-directional capillary action. However, the angle must be such that the end of the thrust bearing vent 702 connected to the second liquid metal reservoir 312 is at a lower radius from a central axis of rotation 320 to ensure gas is not trapped within the thrust bearing vent 702. Additionally, the angle should be between 0 and 45 degrees to achieve the desired capillary effect. In some examples, the angle is preferably less than 10 degrees. The example thrust bearing vent 702 has a constant diameter, which may be between 0.1 mm and 2.5 mm, but is preferably between 0.5 mm and 1.5 mm. The example thrust bearing vent 402 may be created using any suitable machining method, including drilling or laser drilling.

Figure 8:
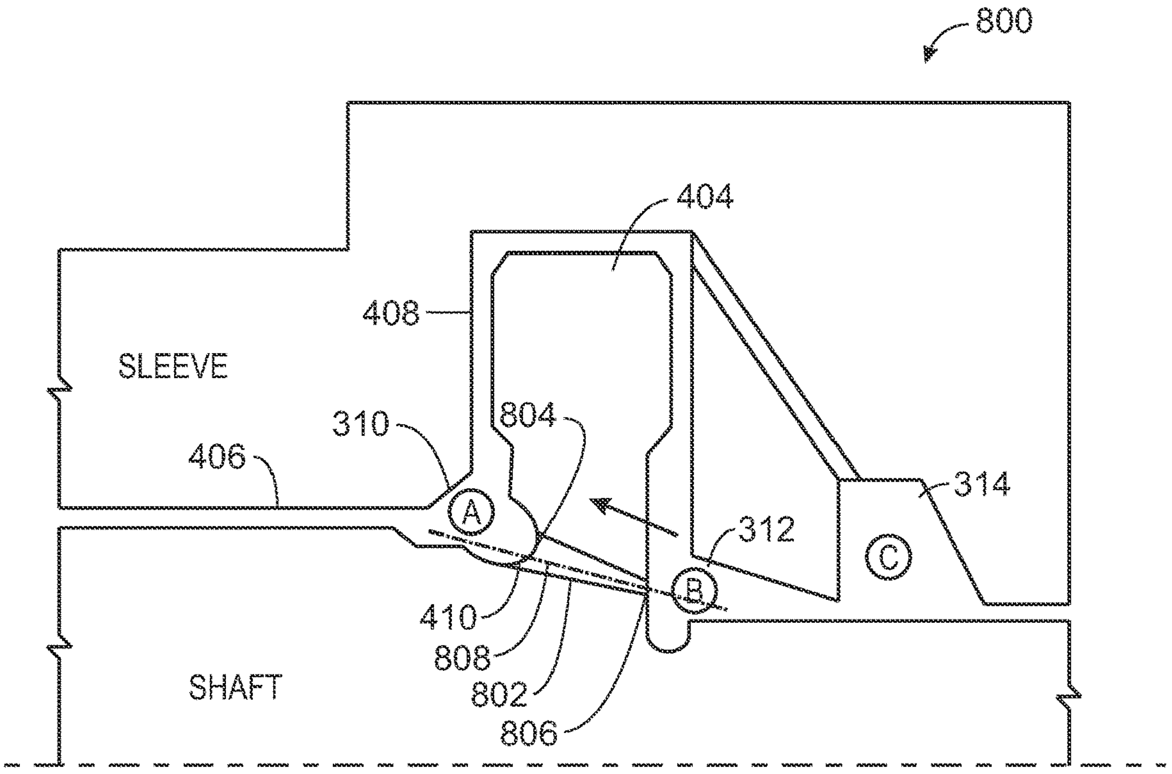
FIG. 8 shows a fifth embodiment of a thrust bearing vent of a liquid metal bearing assembly, according to an embodiment.

FIG. 8 depicts a fifth example embodiment 800 of a thrust bearing vent 802 of a liquid metal bearing assembly is shown. The thrust bearing vent 802 is a conically-shaped hole placed through the thrust flange of the liquid metal bearing intercepting the first liquid metal reservoir 310 formed between the journal 406 and thrust bearings 408 and extending to the second liquid metal reservoir. The example thrust bearing vent 802 is substantially symmetrical about a central axis. Additionally, a central axis 804 of the thrust bearing vent 802 of the illustrated embodiment is positioned at an angle relative to the central axis 320 of the bearing assembly 300. However, in other embodiments, thrust bearing vent 802 may be asymmetrical and/or may have a central axis 804 that is positioned parallel to the central axis of the bearing assembly.

Similar to the thrust bearing vent 402, 502, 602, 702, the thrust bearing vent 802 of FIG. 8 connects a first end 804 to the first liquid metal reservoir 310 at the lowest point of the reservoir 310 and a second end 806 connects to the second liquid metal reservoir 312. In the illustrated example, the conically-shaped thrust bearing vent 802 is tapered toward the second end 806, which connects the thrust bearing vent 802 and the second liquid metal reservoir 312. In the embodiment 800 of FIG. 8, the second end 806 has a smaller diameter than the first end 804. For example, the diameter of the thrust bearing vent 802 at the contact point at the second liquid reservoir 312 may be 0.5 mm and the diameter at the contact point the first liquid reservoir 310 may be 1.5 mm. Other suitable dimensions may be used, such as any diameters between 0.1 mm and 2.5 mm. The example thrust bearing vent 802 may be created using any suitable machining method, including drilling or laser drilling.

This change in diameter results in a departure angle from the contact point at the second liquid metal reservoir 310 that is greater than 0 degrees, resulting in a lower capillary force in the direction of the opening at the first liquid metal reservoir 310, similar to that described in conjunction with FIG. 5. However, because the larger diameter is at the end 804 connected to the first liquid metal reservoir 310, the flow is reversed and instead flows from the second liquid metal reservoir 312 to the first liquid metal reservoir 310.

The example thrust bearing vent 802 has a centerline 808 that is angled relative to the central axis 320 of the bearing assembly. The angle should be between 0 and 45 degrees to achieve the desired capillary effect. In some examples, the angle is preferably less than 10 degrees. The angle must be such that the end of the thrust bearing vent 802 connected to the second liquid metal reservoir 312 is at a lower radius from a centerline to ensure gas is not trapped within the thrust bearing vent 802.

FIGS. 9A-9G depict examples of how the example thrust bearing vents 318, 402, 502, 602, 702, 802 may be positioned radially around the shaft of the bearing assembly 300. To simplify the drawings, the generic label 318 will be used to represent any of the different embodiments of the thrust bearing vents discussed herein. The coordinate system 301 from FIG. 3 is depicted along with the illustrated examples to provide orientation of the thrust bearing vents 318, 402, 502, 602, 702, 802. One or more of the thrust bearing vents 318, 402, 502, 602, 702, 802 may be used with the example bearing assembly 300. If more than one thrust bearing vent 318, 402, 502, 602, 702, 802 implemented, the number of thrust bearing vents 318, 402, 502, 602, 702, 802 is preferably an even number (e.g., 2, 4, or 6) and the thrust bearing vents 318, 402, 502, 602, 702, 802 are preferably in pairs. However, the thrust bearing vents 318, 402, 502, 602, 702, 802 may be positioned symmetrically or asymmetrically around the shaft.

Figure 9A:
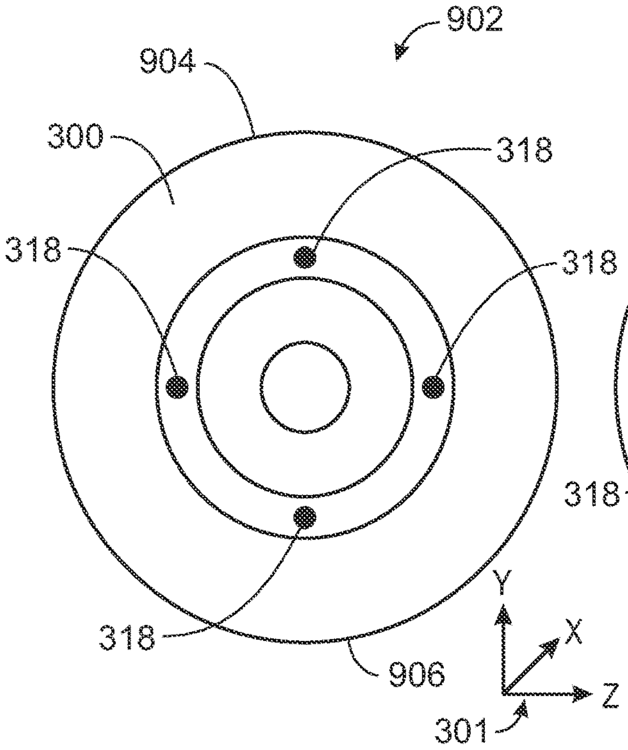
FIGS. 9A-9G shows example radial positions of the thrust bearing vent relative to the applied gantry load and center of axis.

Additionally, due to changes in pressure (e.g., a pressure gradient) from a top 904 to a bottom of the bearing assembly 300, pressures may be different at different placements of the thrust bearing vents 318, 402, 502, 602, 702, 802. The pressure gradient may be caused by body loading from gravity and/or the gantry being in the y-direction. For example, the illustrated embodiment 902 of FIG. 9A, depicts four thrust bearing vents 318, 402, 502, 602, 702, 802 equally spaced radially 90 degrees apart. The thrust bearing vent 318, 402, 502, 602, 702, 802 closer to the top 904 of the bearing assembly 300 will have a different pressure than the thrust bearing vents 318, 402, 502, 602, 702, 802 positioned near the horizontal center of the bearing assembly, and different pressure than the thrust bearing vents 318, 402, 502, 602, 702, 802 positioned near a bottom 906 of the bearing assembly.

Figure 9B:
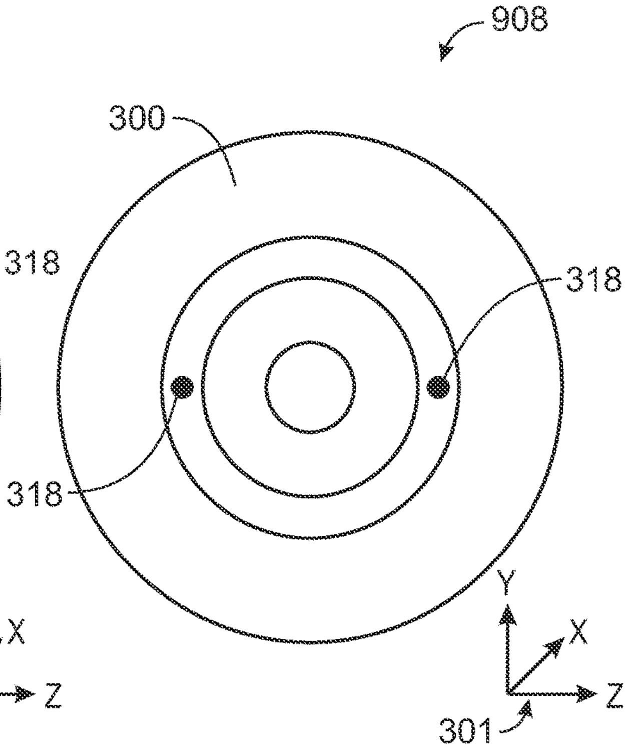

FIG. 9B depicts an embodiment 908 having two thrust bearing vents 318, 402, 502, 602, 702, 802 equally spaced radially 180 degrees apart in a horizontal orientation. The bearing vents 318, 402, 502, 602, 702, 802 in the example embodiment 908 are symmetrical about the vertical axis. The thrust bearing vents 318, 402, 502, 602, 702, 802 of FIG. 9B will have approximately the same pressure. In some examples, FIG. 9B depicts a preferred design.

Figure 9C:
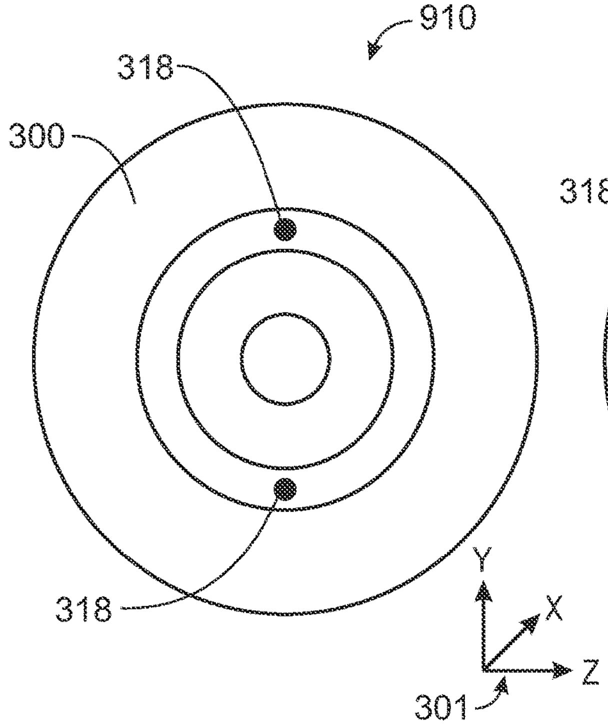

FIG. 9C depicts an embodiment 910 having two thrust bearing vents 318, 402, 502, 602, 702, 802 equally spaced radially 180 degrees apart in a vertical orientation. The bearing vents 318, 402, 502, 602, 702, 802 in the example embodiment 908 are symmetrical about the horizontal axis. The thrust bearing vents 318, 402, 502, 602, 702, 802 of FIG. 9C will have different pressures.

Figure 9D:
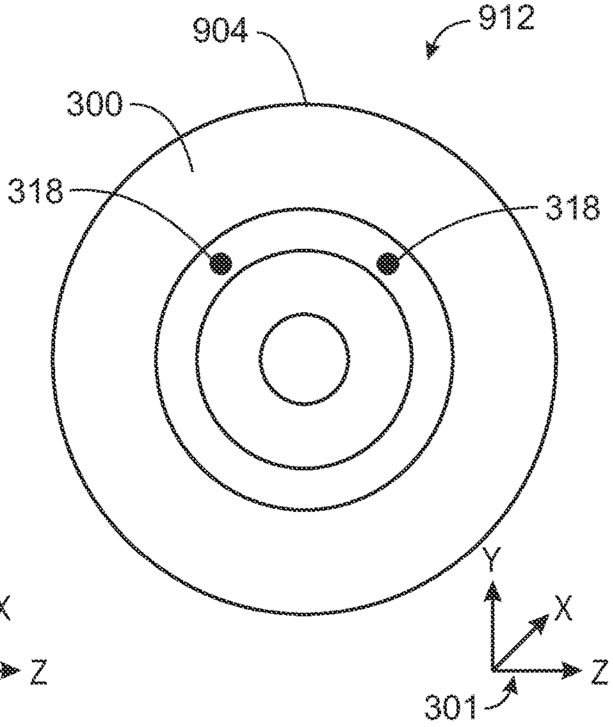

FIG. 9D depicts an embodiment 912 having two thrust bearing vents 318, 402, 502, 602, 702, 802 positioned approximately 60 degrees apart, each positioned approximately 30 degrees one either side off a vertical axis. The bearing vents 318, 402, 502, 602, 702, 802 in the example embodiment 908 are symmetrical about the vertical axis. The thrust bearing vents 318, 402, 502, 602, 702, 802 of FIG. 9D are positioned closer to the top 904 of the bearing assembly and will have approximately the same pressure.

Figure 9E:
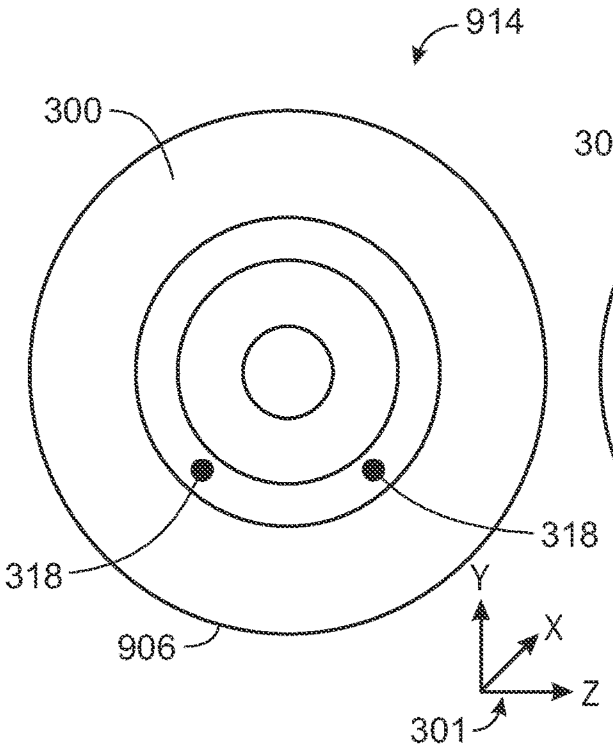

FIG. 9E depicts an embodiment 914 having two thrust bearing vents 318, 402, 502, 602, 702, 802 positioned approximately 60 degrees apart, each positioned approximately 30 degrees one either side off a vertical axis. The bearing vents 318, 402, 502, 602, 702, 802 in the example embodiment 910 are symmetrical about the vertical axis. The thrust bearing vents 318, 402, 502, 602, 702, 802 of FIG. 9E are positioned closer to the bottom 906 of the bearing assembly and will have approximately the same pressure.

Figure 9F:
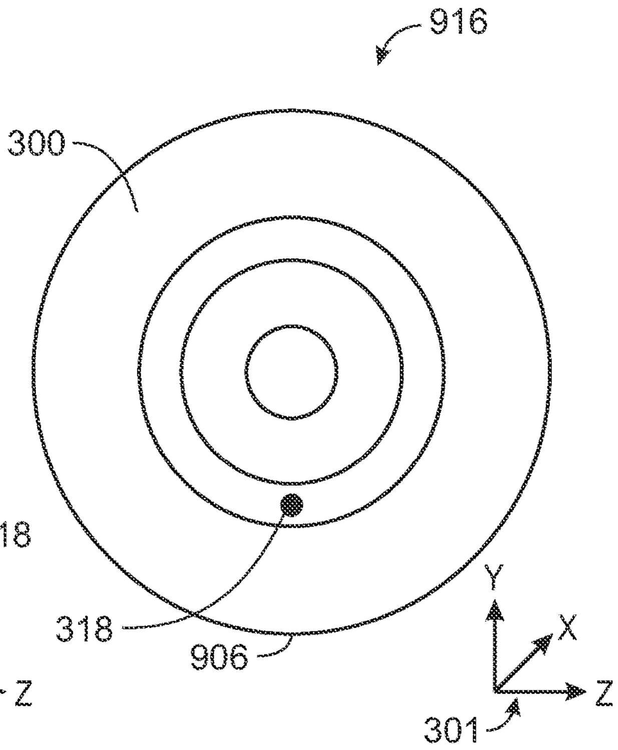

FIG. 9F depicts an embodiment 916 having one thrust bearing vents 318, 402, 502, 602, 702, 802 positioned at the bottom of the bearing assembly 300. In embodiments where there is only a single thrust bearing vent 318, 402, 502, 602, 702, 802 is included, the preferred position of the trust bearing vent 318, 402, 502, 602, 702, 802 is at the bottom 906 of the bearing assembly 300, however any other location of the thrust bearing vent 318, 402, 502, 602, 702, 802 around the shaft is also suitable.

Figure 9G:
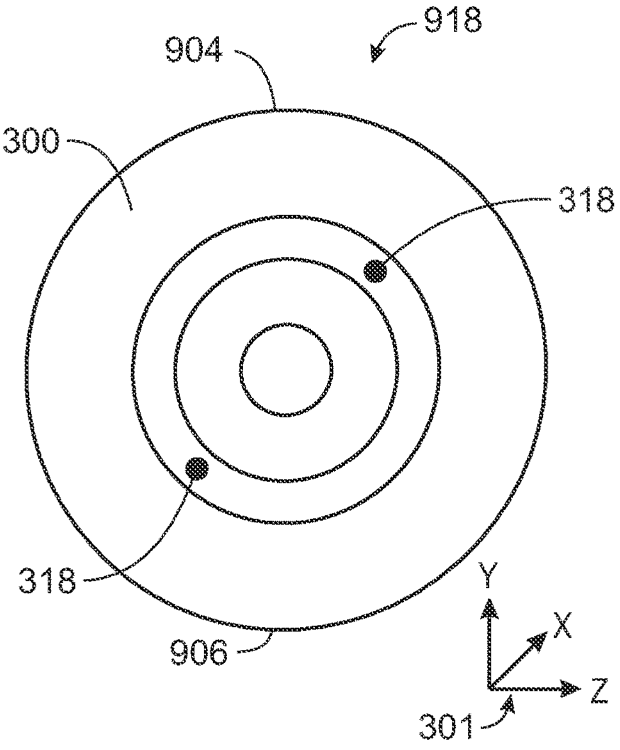

FIG. 9G depicts an embodiment 918 having two thrust bearing vents 318, 402, 502, 602, 702, 802 positioned approximately 180 degrees apart, each positioned approximately 30 degrees one either side off a vertical axis. However, the example thrust bearing vents 318, 402, 502, 602, 702, 802 of the embodiment 910 of FIG. 9G are positioned at opposite ends of the vertical axis, thus resulting in an arrangement that is asymmetrical relative to both the vertical and horizontal axes. That is, one of the thrust bearing vents 318, 402, 502, 602, 702, 802 is positioned adjacent the top 904 and one of the thrust bearing vents 318, 402, 502, 602, 702, 802 is positioned adjacent the bottom 906. The thrust bearing vents 318, 402, 502, 602, 702, 802 of FIG. 9C will have different pressures.

While some example embodiments of placement of the thrust bearing vents 402, 502, 602, 702, 802 has been described, the examples are non-limiting. That is, other variations including additional thrust bearing vents 318, 402, 502, 602, 702, 802, and/or thrust bearing vents 318, 402, 502, 602, 702, 802 placed at different orientations or angles may be implemented as well.

FIGS. 2-9G show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A liquid metal bearing assembly, comprising:

a first liquid metal reservoir;

a second liquid metal reservoir; and a thrust bearing vent extending in an axial direction between the first liquid metal reservoir and the second liquid metal reservoir to vent gas between the first liquid metal reservoir and to the second liquid metal reservoir, wherein a first end of the thrust bearing vent is connected to the first liquid metal reservoir at a point of the first liquid metal reservoir closest to a central axis of the liquid metal bearing assembly.

2. The liquid metal bearing assembly of claim 1, further comprising a rotating component and a stationary component, wherein the rotating component at least partially circumferentially surrounds the stationary component, and the first liquid metal reservoir and the second liquid metal reservoir are positioned between the rotating component and the stationary component.

3. The liquid metal bearing assembly of claim 1, wherein the thrust bearing vent has a constant diameter.

4. The liquid metal bearing assembly of claim 1, wherein the thrust bearing vent has a first diameter at a contact point of the first liquid metal reservoir and a second diameter at a contact point of the second liquid metal reservoir.

5. The liquid metal bearing assembly of claim 4, wherein the thrust bearing vent is conically shaped.

6. The liquid metal bearing assembly of claim 4, wherein the thrust bearing vent has a flared portion.

7. The liquid metal bearing assembly of claim 1, further comprising at least one additional thrust bearing vent.

8. The liquid metal bearing assembly of claim 7, wherein the thrust bearing vent and the at least one additional thrust bearing vent are equally spaced radially around the liquid metal bearing assembly.

9. The liquid metal bearing assembly of claim 7, wherein the thrust bearing vent and the at least one additional thrust bearing vent are positioned symmetrically about an axis of the liquid metal bearing assembly.

10. The liquid metal bearing assembly of claim 7, wherein the thrust bearing vent and the at least one additional thrust bearing vent are positioned asymmetrically about an axis of the liquid metal bearing assembly.

11. The liquid metal bearing assembly of claim 1, wherein the thrust bearing vent is created using laser drilling.

12. An x-ray source, comprising:

a cathode;

an anode with a rotating component where the rotating component is rotated by a liquid metal bearing assembly having a rotating component circumferentially surrounding a stationary component, further comprising:

a first liquid metal reservoir;

a second liquid metal reservoir; and a thrust bearing vent extending in an axial direction between the first liquid metal reservoir and the second liquid metal reservoir to vent gas between the first liquid metal reservoir and to the second liquid metal reservoir, wherein a first end of the thrust bearing vent is connected to the first liquid metal reservoir at a point of the first liquid metal reservoir closest to a central axis of the liquid metal bearing assembly.

13. The x-ray source of claim 12, wherein the first liquid metal reservoir and the second liquid metal reservoir are positioned between the rotating component and the stationary component.

14. The x-ray source of claim 12, wherein the thrust bearing vent has a constant diameter.

15. The x-ray source of claim 12, wherein the thrust bearing vent has a first diameter at a contact point of the first liquid metal reservoir and a second diameter at a contact point of the second liquid metal reservoir.

16. The x-ray source of claim 15, wherein the thrust bearing vent is conically shaped.

17. The x-ray source of claim 15, wherein the thrust bearing vent has a flared portion.

18. The x-ray source of claim 12, further comprising at least one additional thrust bearing vent.

19. The x-ray source of claim 18, wherein the thrust bearing vent and the at least one additional thrust bearing vent are equally spaced radially around the liquid metal bearing assembly.

20. The x-ray source of claim 18, wherein the thrust bearing vent and the at least one additional thrust bearing vent are positioned symmetrically about an axis of the liquid metal bearing assembly.

21. The x-ray source of claim 18, wherein the thrust bearing vent and the at least one additional thrust bearing vent are positioned asymmetrically about an axis of the liquid metal bearing assembly.

* * * * *